Jan. 21, 1969     T. H. WILSON ET AL     3,422,695
CHART DRIVE MECHANISM
Filed June 13, 1966     Sheet 1 of 2
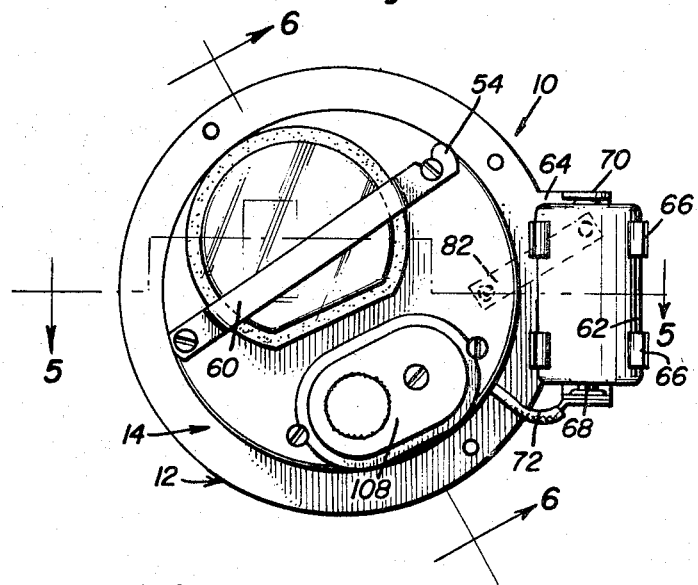
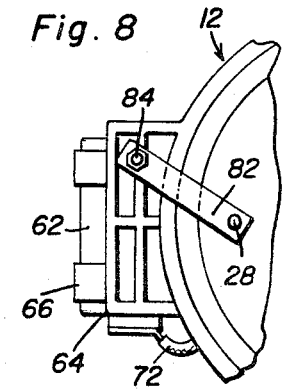
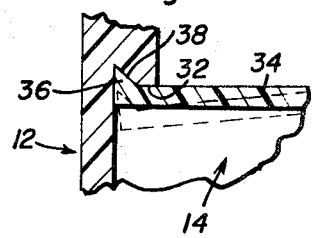
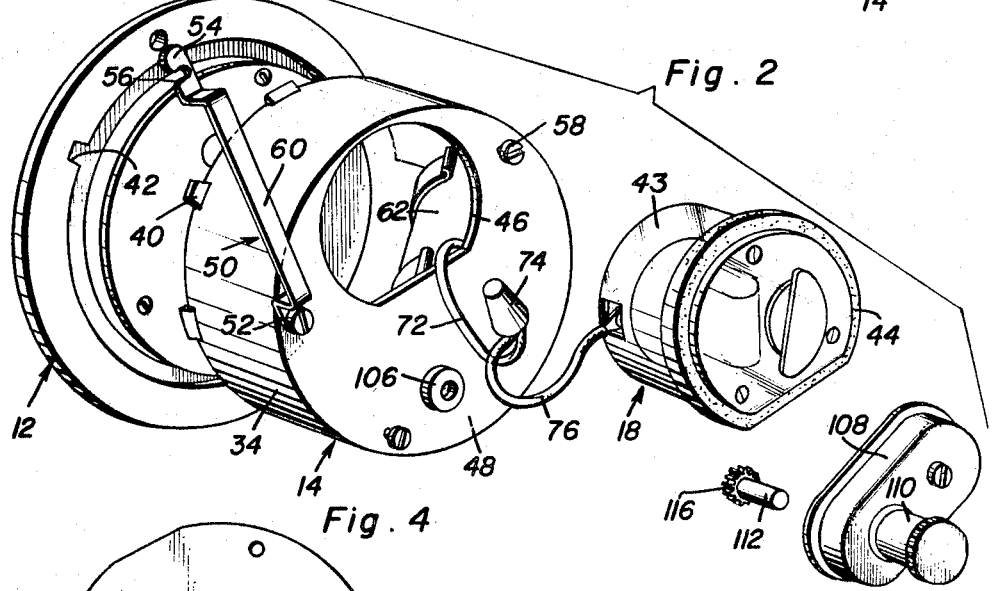
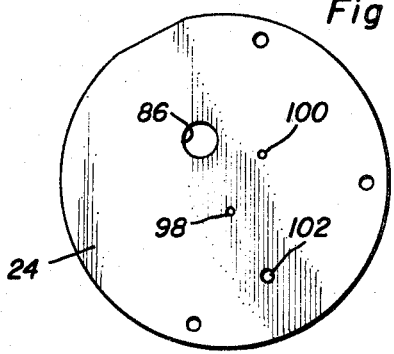
Thomas H. Wilson
Woodrow A. Wilson
INVENTORS
BY Clarence A. O'Brien
and Harvey B. Jacobson
Attorneys Jan. 21, 1969  T. H. WILSON ET AL  3,422,695
CHART DRIVE MECHANISM
Filed June 13, 1966

Thomas H. Wilson
Woodrow A. Wilson
INVENTORS

BY *Clarence A. O'Brien*
*and Harvey B. Jacobson*
Attorneys

United States Patent Office
3,422,695
Patented Jan. 21, 1969

3,422,695
CHART DRIVE MECHANISM
Thomas H. Wilson, 214 Cambridge, Longview, Tex. 75601, and Woodrow A. Wilson, Longview, Tex.; said W. A. Wilson, assignor to said T. H. Wilson
Filed June 13, 1966, Ser. No. 556,963
U.S. Cl. 74—421                 15 Claims
Int. Cl. F16h 1/00; G01d 15/26

The instant invention is concerned with new and useful improvements in chart drive mechanisms.

Chart drive mechanisms, of the same general type herein involved, are normally used in conjunction with measuring instruments of various types for recording flow pressures, gas temperatures, volumetric flow, etc. One of the more serious difficulties encountered with regard to the use of such drive mechanisms resides in the time delay in removing the entire mechanism for repair or replacement should any malfunctioning occur. In view of this, and inasmuch as it is usually only the clockwork unit which must be cleaned or repaired, it is a primary object of the instant invention to provide a drive mechanism wherein the clockwork unit is itself readily and easily separated from the mechanism, thus avoiding the necessity of removing and dismantling the entire drive mechanism. By the same token, the drive mechanism of the instant invention can be immediately put back into operation by merely substituting another clockwork unit, the cost of the individual clockwork units being substantially less than that of the entire mechanism. This enabling the return of the mechanism to operational condition in a manner of seconds, along with the avoiding of the expense of either maintaining an inventory of entire drive mechanisms or awaiting a dismantling of the unit with the integrally mounted clockwork mechanism for repair, results in substantial economies.

Another important object of the instant invention resides in the provision of a housing for drive mechanism, including the clockwork unit, which housing is capable of being fixedly mounted or removed through a simple manipulation thereof, without the use of tools or the like.

Likewise, a significant object of the instant invention resides in the provision of gearing whereby the rotation period of the chart drive mechanism can be quickly and easily changed from one period to another as required.

In conjunction with the provision of a removable clockwork unit, it is also a significant object of the instant invention to provide means for fixedly retaining the unit, while at the same time allowing for a quickly manual release thereof, without requiring the use of any type of tool.

Furthermore, it is a significant object of the instant invention to provide a compact chart drive mechanism which operates on a conventional 1.5 volt battery mounted directly thereon and conductively communicated with the clockwork unit through the gear train itself.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of the chart drive mechanism of the instant invention;

FIGURE 2 is an exploded perspective view of the various elements of the drive mechanism;

FIGURE 3 is an enlarged cross-sectional detail illustrating the manner in which the cover or housing is fixedly engaged with the base;

FIGURE 4 is a plan view of one of the gear mounting plates;

FIGURE 8 is a partial plan view of the undersurface of the base illustrating the manner in which the conductive path to the battery is completed.

Figure 5:
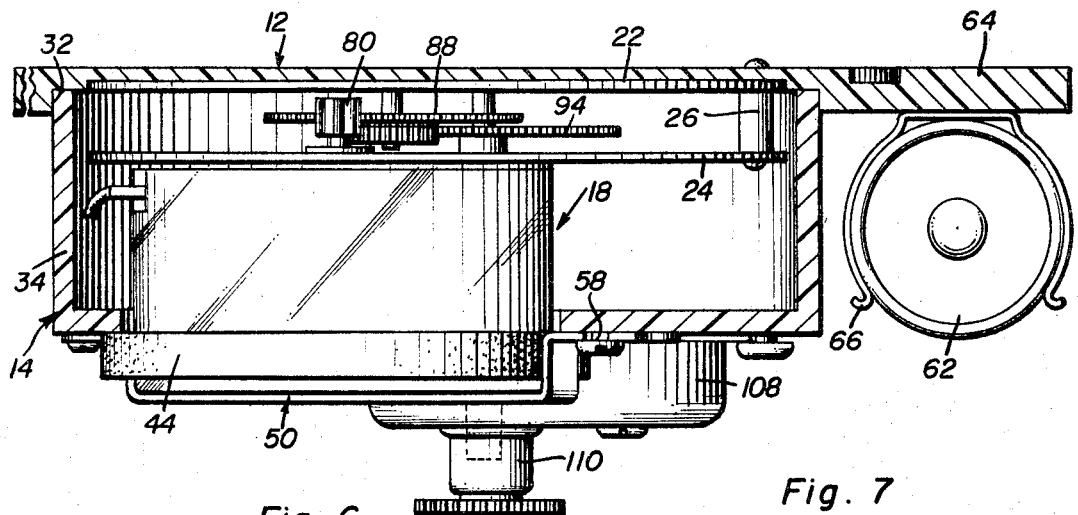
FIGURE 5 is an enlarged cross-sectional view taken substantially along line 5—5 in FIGURE 1.

Referring now more specifically to the drawings, reference numeral 10 is used to generally designate the chart drive mechanism comprising the instant invention. This mechanism 10 includes an enlarged circular base 12, a removable cover or housing 14, a gear assembly 16, and a self-contained clockwork unit 18 releasably mounted within the housing 14 in driving engagement with the gear assembly 16.

The base 12 includes a central circular recess 20 therein which closely receives a first flat gear mounting plate 22, this plate 22, in conjunction with a second similar plate 24 spaced laterally thereof, defines a gear train chamber within which the gear assembly 16 is located. A plurality of sleeve-like spacers 26 are positioned between the plates 22 and 24 about the periphery thereof, these spacers being internally threaded from the opposite ends thereof so as to receive fastening bolts or screws 28 and 30, the bolts or screws 28 extending through the base 12 and plate 22 prior to engagement within the corresponding spacer 26, while the bolts or screws 30 extend through the outer plate 24 and into the corresponding sleeve 26.

Surrounding the central circular recess 20 is an outwardly stepped shoulder portion which defines an annular wall 32, this annular wall 32 snugly receiving the relatively wide annular wall 34 of the housing 14. The locking engagement of the housing 14 with the base 12, both being made of a suitable plastic, is effected through an engagement of a plurality of laterally projecting locking lugs 36, integral the free edge of the annular wall 34 of the housing 14, within a plurality of complementary undercut recesses 38 provided within the annular base wall 32 adjacent the inner end thereof. This locking structure is best seen in FIGURE 3 wherein it will also be noted that complementary inclined camming surfaces are provided on each locking lug 36 and its corresponding recess 38 so as to effect an inward drawing of the housing 14 toward the base 12. The actual engagement of the locking lugs 36, four such lugs normally being provided, is effected by flexing the annular wall 34 of the housing 14 slightly inward so as to clear the outer portion of the wall 32 sufficiently to introduce the lugs 36 into their corresponding recesses 38. This has been suggested in the phantom line showing in FIGURE 3. Further, with reference to FIGURE 2, it will be noted that a guide projection 40 has been provided on the periphery of the annular wall 34 for reception within a similarly shaped notch 42 in the base 12 so as to insure a proper alignment of the locking lugs 36 with their recesses 38 during the mounting of the housing 14. Thus, it will be appreciated that a unique means has been devised for releasably and fixedly mounting the housing 14 on the base 12 in a manner which enables a removal of the housing solely by means of a physical inward moving of various portions of the annular housing wall 34 against the inherent resiliency of the housing material.

The clockwork unit 18 is of any commercially available type sealed within a case 43, preferably transparent. The clockwork unit 18 is provided with a rubber seal or sealing collar 44 about the outer end of the casing 43, this collar 44 both sealing the enlarged aperture 46 within the top wall 48 of the housing 14 within which the clockwork unit 18 is received, and constituting a means for limiting movement of the casing 43 through the aperture 46 so as to properly position the unit 18.

The unit 18 is fixed within the housing 14 by means of a releasable securing strap 50 which has one end 52 thereof pivotally engaged with the top wall 48 to one side of the unit receiving aperture 46 and which is provided, at the opposite end 54 thereof, with a laterally directed notch 56 which engages over the shank of a headed keeper bolt or the like 58 fixed to the top wall 48 substantially diametrically opposed to the point of engagement of the first end 52 of the strap 50 upon a flexing of the strap over the casing. The intermediate portion 60 of the strap 50 is outwardly deformed so as to generally correspond in shape to the outer exposed portion of the casing 43 and the encircling seal or collar 44, with the engagement of the strap 50 under tension, and its release, being effected through the ability of the strap 50, preferably of stainless steel, to flex slightly so as to engage the keeper bolt 58, below the head thereof. It is of significance that the strap 50 can be released and the unit 18 removed without resorting to the use of tools.

The clockwork unit is to be battery powered, using a conventional 1.5 volt battery 62. The battery 62 is mounted upon an integral coplanar outwardly directed base extension 64 by means of a battery mount structure including a pair of battery retaining spring clips 66. The battery mount is provided with a pair of battery containing terminals 68 and 70 with the terminal 68 having an elongated flexible conductor 72 conductively connected thereto and extending therefrom for releasable engagement, by means of a conventional wire nut 74, with a similar flexible conductor 76 conductively communicated with the clockwork unit 18 within the casing 43. Engagement with the opposite terminal 70 is effected directly through the gear assembly 16, the rearwardly projecting drive shaft 78 and drive pinion 80 of the clockwork unit 18, and a conductive strap 82 underlying the base 12 and mounted on an adjacent one of the plate fixing screws 28 and a bolt 84 extending through the base extension 64 and into conductive engagement with the terminal 70 through the battery mount itself. It will of course be appreciated that the plate 22 and spacer sleeves 26 are conductive in nature so as to establish the conductive path from the unit 18 to the terminal 70.

Figure 7:
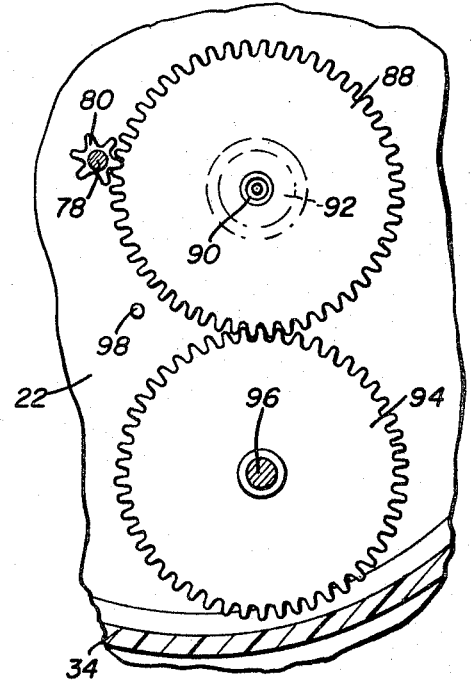
FIGURE 7 is an enlarged detail view of a modified gear arrangement.

As noted above, the clockwork unit 18 includes a rearwardly projecting drive shaft 78 and pinion gear 80. This pinion 80 is positioned between the plates 22 and 24 through an enlarged aperture 86 within the forward plate 24, the unit casing 43 seating on this plate 24 and being sealed and stabilized about its upper end by the sealing collar 44. Upon an introduction of the drive pinion 80 into the gear chamber between the plates 22 and 24, this pinion 80 meshingly engages with an enlarged gear 88 affixed to a rotatably mounted shaft 90 and in turn engaged, either directly as illustrated in FIGURE 7 or indirectly through a smaller gear 92 also fixed to the shaft 90, with an enlarged gear 94 mounted upon the turret shaft 96.

Figure 6:
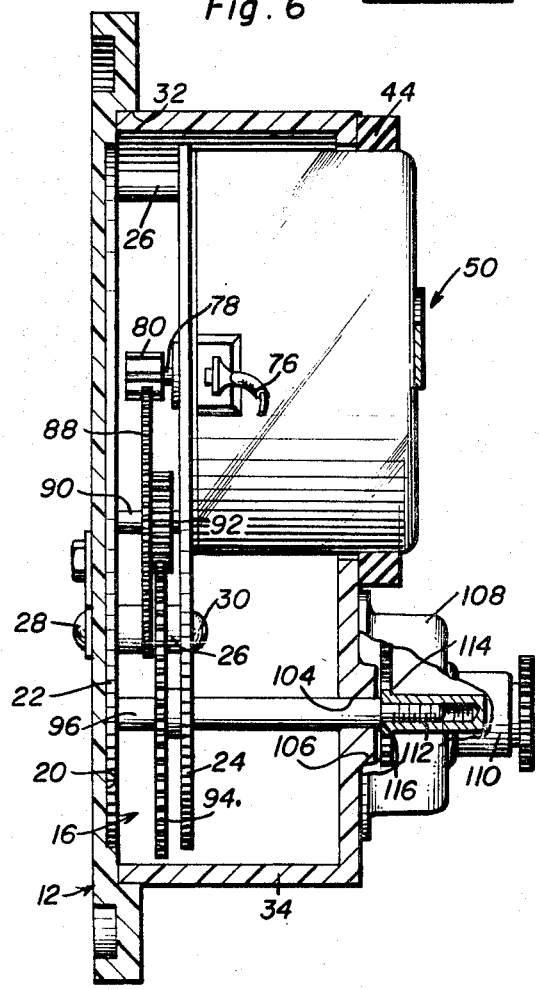
FIGURE 6 is an enlarged cross-sectional view taken substantially along line 6—6 in FIGURE 1.

The shaft 90 has the opposite ends thereof reduced and releasably and rotatably mounted within bearing holes 98 in the plates 22 and 24. Mounted in the manner illustrated in FIGURES 5 and 6, it will be noted that the enlarged gear 88 engages the pinion 80 while the smaller gear 92 engaged the turret shaft gear 94. It is contemplated that a second pair of bearing apertures 100 also be provided within the plates 22 and 24 whereby the shaft 90, with the gears 88 and 92 fixed thereon, may be inverted so as to directly engage the enlarged gear 88 with both the pinion 80 and the turret gear 94 as illustrated in FIGURE 7. In this manner, it should be appreciated that a highly simplified means has been provided for changing the rotation period, for example from a seven day rotation period to a twenty-four hour rotation period. The turret shaft 96, rotatably supported at the lower end thereof in a suitable bearing aperture or socket in the plate 22, extends through aperture 102 in the plate 24 and through a similar aperture 104 in the cover top 48 immediately thereabove, this aperture 48 being surrounded by a positioning enlargement 106 upon which an appropriate adapter turret 108 is mounted, such turrets 108 being a commercially available item utilized so as to achieve a different rotation period. The turret 108 is in turn provided with a chart hub 110. Returning now specifically to the turret shaft 96, it will be noted that a cap nut 112 is threaded on the upper end thereof above the top wall 48 and in engagement with the enlargement 106. This nut 112 has an integral gear flange 114 about the lower end thereof which meshingly engages with the turret gears within the adapter turret. Incidentally, it will be noted that the threaded end of the turret shaft 96 which receives the cap nut 112 is of a reduced diameter so as to define a shoulder 116 against which the nut 112 actually seats slightly above the cover enlargement 106 whereby a free rotation of the shaft 96 is insured.

From the foregoing, it should be appreciated that a highly unique chart drive mechanism has been defined. This mechanism is particularly significant in that the clockwork drive therefor is capable of being independently removed as a unit through merely a swinging release of the securing strap 50 and a removal of the wire nut 74 which conductively interlocks the conductor wires 72 and 76. The sliding engagement and disengagement of the clockwork drive with the gear train assembly is automatically effected in conjunction with an insertion or removal of the clockwork unit with the elongated nature of the drive pinion 80 assuring proper driving connection. By the same token, access to the interior of the housing can be easily achieved through an inward flexing of the housing wall 34 so as to release the locking lugs 36, the housing then being moved away from the base 12 so as to expose the gear assembly between the mounting plates 22 and 24. Also of significance is the utilization of a power source in the form of a mounted battery with the gear assembly itself providing a conductive path to the battery from the clockwork unit. A final feature of particular significance is the construction of the gear assembly in a manner whereby the rotation period can be quickly changed through merely an inverting of an intermediate gear mounting shaft 90 and a relocation of the shaft 90 within a pair of opposed auxiliary mounting holes. This inverting of the shaft 90 will of course involve a removal of the plate 24, this in turn requiring only a matter of minutes and the use of a screwdriver for releasing and fastening the screws 30.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Chart drive mechanism comprising a mounting base, a cover defining a housing on said base, cover securing means releasably fixing said cover to said base, a first shaft rotatably mounted on said base and projecting through said cover, a mounting aperture defined within said cover, a clockwork unit mounted within said aperture, said unit including a drive shaft unit, securing means releasably securing said clockwork unit in its mounted position, a gear train drivingly engaging said first shaft with said drive shaft within said housing, said clockwork unit being outwardly removable as a unit from the remainder of the mechanism upon a release of the unit securing means, said unit including a power conductor, and means for releasably engaging said conductor with a power source.

2. The mechanism of claim 1 wherein said gear train includes a drive gear fixed to the drive shaft, said drive gear being freely disengageable from the remainder of the gear train upon an outward movement of the clockwork unit.

3. The mechanism of claim 2 wherein said unit securing means comprises strap means mounted on said cover and movable from a first withdrawn position allowing free movement of the unit into and out of said aperture, and a second position overlying a portion of a received unit so as to prevent the outward movement thereof.

4. The mechanism of claim 3 wherein said strap means includes an elongated strap of a length so as to transversely span said unit, said strap being pivotally fixed at one end to said cover to one side of the unit receiving aperture, keeper means on said cover in opposed relation to the fixed end of the strap, and means on the second end of the strap selectively engageable with said keeper means.

5. The mechanism of claim 4 wherein said base includes an annular wall and said cover includes a laterally projecting annular wall closely receivable within the base wall, said cover securing means comprising a plurality of undercut sections in said base wall, and a plurality of outwardly directed lugs on said cover wall receivable within said undercut sections upon an inward flexing of the cover wall.

6. The mechanism of claim 5 including a battery mount on said base, said battery mount including opposed terminals, a second power conductor leading from a first terminal for releasable engagement with the first mentioned conductor, said gear train being electrically conductive and establishing a conductive path from the clockwork to the second terminal.

7. The mechanism of claim 6 wherein said gear train includes a gear fixed to said first shaft for the rotational driving thereof, an intermediate shaft rotatably mounted on said base between the first and drive shafts, and gear means on said intermediate shaft drivingly engaged between the drive gear and the first shaft gear.

8. The mechanism of claim 7 wherein said base includes spaced shaft journaling means selectively receiving said intermediate shaft, said intermediate shaft gear means being engaged with both the drive gear and the first shaft gear when mounted on each of said shaft journaling means.

9. The mechanism of claim 7 wherein said clockwork unit includes a sealed case thereabout and a sealing collar surrounding said case and defining an abutment engaging said cover about the cover aperture.

10. The mechanism of claim 2 wherein said gear train includes a gear fixed to said first shaft for the rotational driving thereof, an intermediate shaft rotatably mounted on said base between the first and drive shafts, and gear means on said intermediate shaft drivingly engaged between the drive gear and the first shaft gear.

11. The mechanism of claim 1 wherein said unit securing means comprises strap means mounted on said cover and movable from a first withdrawn position allowing free movement of the unit into and out of said aperture, and a second position overlying a portion of a received unit so as to prevent the outward movement thereof.

12. The mechanism of claim 11 wherein said strap means includes an elongated strap of a length so as to transversely span said unit, said strap being pivotally fixed at one end to said cover to one side of the unit receiving aperture, keeper means on said cover in opposed relation to the fixed end of the strap, and means on the second end of the strap selectively engageable with said keeper means.

13. The mechanism of claim 11 wherein said clockwork unit includes a sealed case thereabout and a sealing collar surrounding said case and defining an abutment engaging said cover about the cover aperture.

14. The mechanism of claim 1 wherein said base includes an annular wall and said cover includes a laterally projecting annular wall closely receivable within the base wall, said cover securing means comprising a plurality of undercut sections in said base wall, and a plurality of outwardly directed lugs on said cover wall receivable within said undercut sections upon an inward flexing of the cover wall.

15. The mechanism of claim 1 including a battery mount on said base, said battery mount including opposed terminals, a second power conductor leading from a first terminal for releasable engagement with the first mentioned conductor, said gear train being electrically conductive and establishing a conductive path from the clockwork to the second terminal.

References Cited

UNITED STATES PATENTS

| | | | |
|---|---|---|---|
| 1,935,686 | 11/1933 | Whitehead et al. | 74—421 X |
| 2,670,794 | 3/1954 | Gallagher | 74—421 X |
| 2,993,741 | 7/1961 | Malty et al. | 346—137 X |
| 3,064,261 | 11/1962 | Maeder | 346—137 |
| 3,205,502 | 9/1965 | Chatelain et al. | 346—20 X |

DONLEY J. STOCKING, *Primary Examiner.*

LEONARD H. GERIN, *Assistant Examiner.*

U.S. Cl. X.R.

74—606; 346—20, 137